United States Patent
Lamotte et al.

(10) Patent No.: US 11,273,679 B2
(45) Date of Patent: Mar. 15, 2022

(54) STABILIZER BAR AND STABILIZATION METHOD

(71) Applicant: Volvo Truck Corporation, Gothenburg (SE)

(72) Inventors: Christopher Lamotte, Saint Savin (FR); Jean-Marc Blond, Saint Pierre de Chandieu (FR)

(73) Assignee: Volvo Truck Corporation, Gothenburg (SE)

( * ) Notice: Subject to any disclaimer, the term of this patent is extended or adjusted under 35 U.S.C. 154(b) by 342 days.

(21) Appl. No.: 16/467,021

(22) PCT Filed: Dec. 6, 2016

(86) PCT No.: PCT/IB2016/001924
§ 371 (c)(1),
(2) Date: Jun. 5, 2019

(87) PCT Pub. No.: WO2018/104761
PCT Pub. Date: Jun. 14, 2018

(65) Prior Publication Data
US 2019/0315175 A1    Oct. 17, 2019

(51) Int. Cl.
*B60G 9/00* (2006.01)
*B60G 11/44* (2006.01)
(Continued)

(52) U.S. Cl.
CPC ............ *B60G 9/003* (2013.01); *B60G 11/44* (2013.01); *B60G 11/64* (2013.01);
(Continued)

(58) Field of Classification Search
CPC ............ B60G 21/055; B60G 21/0551; B60G 21/052; B60G 9/003; B60G 9/00;
(Continued)

(56) References Cited

U.S. PATENT DOCUMENTS 5,326,128 A * 7/1994 Cromley, Jr. .......... B60G 3/145
180/906
6,089,583 A * 7/2000 Taipale .................. B60G 7/001
280/124.13
(Continued)

FOREIGN PATENT DOCUMENTS

DE    3737735 C1    6/1988
DE    4342809 A1    6/1994
(Continued)

OTHER PUBLICATIONS

International Search Report and Written Opinion for International Patent Application No. PCT/IB2016/001924, dated Jun. 1, 2017, 13 pages.

*Primary Examiner* — Paul N Dickson
*Assistant Examiner* — Caitlin Anne Miller
(74) *Attorney, Agent, or Firm* — Withrow & Terranova, PLLC

(57) ABSTRACT

The invention relates to stabilizer bar (10) for use with the suspension of a vehicle such as a truck. The stabilizer bar (10) comprises a shaft (12) supported by bearings (18), cranked parts for example in the form of crank arms (30) being provided at or adjacent each end of the shaft (12), each cranked part having a connection point (32) for connection, in use, to a respective link member (34), wherein each connection point (32) is substantially aligned with a respective one of the bearings (18) relative to the axis of the shaft (12). The invention also relates to a vehicle incorporating such a stabilizer bar (10) and to a roll stabilization method using such a stabilizer bar (10).

12 Claims, 2 Drawing Sheets

(51) Int. Cl.
*B60G 11/64* (2006.01)
*B60G 21/055* (2006.01)

(52) U.S. Cl.
CPC ...... *B60G 21/0551* (2013.01); *B60G 2200/31* (2013.01); *B60G 2202/112* (2013.01); *B60G 2202/135* (2013.01); *B60G 2202/152* (2013.01); *B60G 2204/1222* (2013.01); *B60G 2204/1224* (2013.01); *B60G 2204/4108* (2013.01); *B60G 2204/418* (2013.01); *B60G 2206/427* (2013.01)

(58) Field of Classification Search
CPC .................. B60G 11/44; B60G 11/64; B60G 2204/1224; B60G 2204/1222; B60G 2204/418; B60G 2204/4108; B60G 2200/31
See application file for complete search history.

(56) References Cited

U.S. PATENT DOCUMENTS

| | | | |
|---|---|---|---|
| 6,209,896 | B1 | 4/2001 | Hickling |
| 7,168,718 | B2 * | 1/2007 | Svartz .................... B60G 9/025 280/124.13 |
| 9,931,903 | B2 * | 4/2018 | Eismann ................ B60G 11/20 |
| 10,214,068 | B2 * | 2/2019 | Langhorst ............ B60G 13/005 |
| 2006/0017252 | A1 * | 1/2006 | Oki ...................... B60G 11/183 280/124.106 |
| 2007/0114746 | A1 * | 5/2007 | Tucker .................. B60G 21/05 280/124.116 |
| 2013/0257004 | A1 | 10/2013 | Johnson |

FOREIGN PATENT DOCUMENTS

| | | | | |
|---|---|---|---|---|
| EP | 0391222 | A1 * | 10/1990 | ......... B60G 21/0551 |
| EP | 0391222 | A1 | 10/1990 | |
| EP | 2650151 | A2 | 10/2013 | |
| GB | 911198 | A * | 11/1962 | ............. B66C 23/78 |
| WO | 2008066446 | A1 | 6/2008 | |
| WO | 2010077186 | A1 | 7/2010 | |

* cited by examiner

STABILIZER BAR AND STABILIZATION METHOD

This application is a 35 USC 371 national phase filing of International Application No. PCT/IB2016/001924, filed Dec. 6, 2016, the disclosure of which is incorporated herein by reference in its entirety.

TECHNICAL FIELD

The invention relates to a stabilizer bar for a vehicle, and in particular to a stabilizer bar suitable for use with, for example, the suspension associated with the front or rear axle of a vehicle such as a heavy duty truck, the stabilizer bar being operable to control or limit rolling movement of the vehicle chassis or body as the vehicle passes around a curve. The invention further relates to a vehicle incorporating such a stabilizer bar and to a stabilization method using such a stabilizer bar.

The invention can be applied in heavy-duty vehicles, such as trucks, buses and construction equipment. Although the invention will be described with respect to a suspension associated with a truck, the invention is not restricted to this particular type of vehicle, and may also be used in other vehicles or in other applications. By way of example, it could be applied to the suspension of a cab or the like.

BACKGROUND

A number of designs of stabilizer bar suitable for use in applications of this type are known. A typical form of stabilizer bar is illustrated in FIG. 1 and comprises a shaft 5 supported by bearings 6 so as to allow limited angular movement of the shaft 5 or at least the end parts 5a thereof to occur. End parts 5a of the shaft 5 are of cranked form, and are arranged to be pivotally connected to other parts of the suspension arrangement of the vehicle via stabilizer rods 7. In use, rolling movement of vehicle body will result in the cranked end part 5a at one end of the shaft 5 undergoing angular movement about the longitudinal axis of the shaft 5 relative to the other of the cranked end parts 5a. Such angular movement applies a twisting, torsional load to the shaft 5. This relative angular movement is resisted by the inherent stiffness of the shaft 5, thus the shaft 5 serves to control or limit the rolling movement.

Whilst such arrangements may operate satisfactorily in limiting or controlling rolling movement, it has been found that, in use, the geometry of such arrangements results in other loadings being experienced. By way of example, as the bearings 6 are located inboard of the cranked parts 5a, and so the ends of the cranked parts 5a are spaced apart (by distance d as illustrated in FIG. 1) from the bearings 6 in the longitudinal direction of the shaft 5, the loads applied to the ends of the cranked parts 5a, in use, result in the application of loads to the shaft 5 tending to cause bending of the shaft 5 in addition to the intended torsional loadings. Such bending may allow undesirable rolling movement to occur, and may also serve to weaken the stabilizer bar or reduce the working life of the stabilizer bar. The shaft 5 and bearings 6 must thus be designed in such a manner as to allow such loadings to be withstood, avoiding unacceptable bending of the shaft 5. This can lead to undesirable increases in dimensions and weight. A further disadvantage with some known arrangements is that undesirable axial movement of the stabilizer bar may occur, in use, which may interfere with the normal operation of the stabilizer bar. Furthermore, many stabilizer bar designs are of relatively large dimensions, leading to difficulties in accommodating the stabilizer bar on the vehicle and lacing ground clearance constrains upon the vehicle, especially where used with construction vehicles.

SUMMARY

An object of the invention is to provide a stabilizer bar in which at least some of the disadvantages associated with known arrangements are overcome or are of reduced impact.

The object is achieved by a stabilizer bar comprising a shaft supported by bearings, cranked parts being provided at or adjacent each end of the shaft, each cranked part having a connection point for connection, in use, to a respective stabilizer rod member, wherein each connection point is substantially aligned with a respective bearing relative to the axis of the shaft.

In other words, each connection point is substantially located in the same plane as one of the bearings supporting said shaft, with said plane being perpendicular to the axis of the shaft.

By the provision of a stabilizer bar in which the connection points are substantially aligned with the respective bearings, it will be appreciated that the application of a load to the cranked parts by way of the connection points does not result in the application of a moment to the stabilizer bar causing bending thereof. By avoiding the application of such a moment, it will be appreciated that the shaft need not be of increased dimensions.

The shaft of the stabilizer bar is preferably hollow at least adjacent the ends thereof. The shaft may be hollow throughout its length.

When the shaft of the stabilizer bar is hollow at least adjacent the ends thereof or throughout its length, the bearings are preferably located within said shaft and they are more preferably located in the hollow ends of the shaft By locating the bearings within the stabilizer bar, it will be appreciated that the overall dimensions of the stabilizer bar may be further reduced. The ground clearance and/or packaging issues that may be experienced with typical arrangements may thus be reduced or overcome.

In a preferred arrangement of the invention and when the bearings are located in the hollow ends of the shaft, the cranked parts are attached to the ends of the shaft that contain the bearings.

More specifically and when the bearings are located within the shaft, each bearing extends inside the shaft of the stabilizer bar over a given length that is measured parallel to the axis of the shaft and each cranked part is attached to the outside surface of the shaft at a point of attachment that is located within said given length.

Said given length is preferably comprised between a length equal to the inner diameter of the shaft and a length equal to twice said inner diameter of the shaft.

The bearings are preferably mounted upon brackets that abut ends of the shaft.

By arranging for the bearings to be supported in this fashion upon brackets that are able to engage the ends of the shaft, it will be appreciated that undesirable axial movement of the shaft can be avoided.

Each bearing preferably comprises a flexible material bushing located upon a support and compressed between a part of the support and a part of the respective bracket, the bushing being located within the shaft.

Such an arrangement represents a convenient way of mounting the shaft for limited angular movement without unnecessarily increasing the dimensions of the stabilizer bar.

Consequently, packaging issues are reduced. Furthermore, ground clearance limitations experienced with other stabilizer bar designs may be reduced or overcome.

The shaft preferably is of a composite material. As a consequence, its weight may be held at a relatively low level. As the invention avoids or reduces the application of bending loads to the shaft, it will be appreciated that the primary load experienced by the composite material shaft, in use, will be a torsional load, and the shaft may be designed to be able to withstand such loads.

The cranked parts may comprise crank arms secured to the shaft. Each crank arm is preferably of substantially planar form. The connection point of each cranked part conveniently comprises an opening formed in the respective cranked part.

The invention further relates to a vehicle comprising a chassis or body, at least one axle, a suspension arrangement whereby the body is mounted upon the axle, and a stabilizer bar as defined hereinbefore, the stabilizer bar being mounted to the axle by way of the bearings, and the connection points being connected, via the stabilizer rod members, to the chassis or body.

Such a vehicle benefits from the advantages set out hereinbefore.

The invention additionally relates to a stabilization method comprising providing a vehicle with a stabilizer bar as defined hereinbefore in such a manner that rolling movements result in the application of a torsional load to the shaft of the stabilizer bar, the substantially axial alignment of each connection point with the associated bearing relative to the axis of the shaft substantially avoiding the application of a bending moment to the shaft.

A vehicle employing the above method is advantageous in that roll stabilization may be achieved using a compact, relatively low weight stabilizer bar. Accordingly, the benefits outlined hereinbefore apply.

Further advantages and advantageous features of the invention are disclosed in the following description and in the dependent claims.

BRIEF DESCRIPTION OF THE DRAWINGS

With reference to the appended drawings, below follows a more detailed description of an embodiment of the invention cited as an example.

In the drawings.

DETAILED DESCRIPTION OF EXAMPLE EMBODIMENTS OF THE INVENTION

Figure 2:
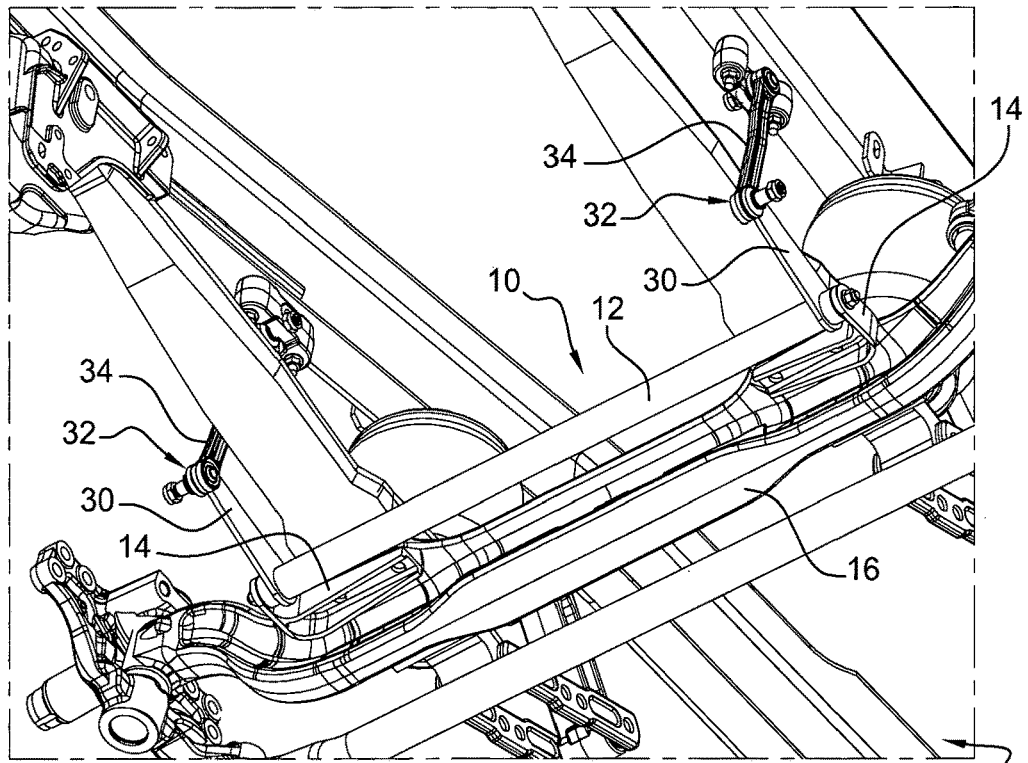
FIG. 2 is a perspective view illustrating part of a vehicle suspension arrangement incorporating a stabilizer bar in accordance with an embodiment of the invention.
Figure 3:
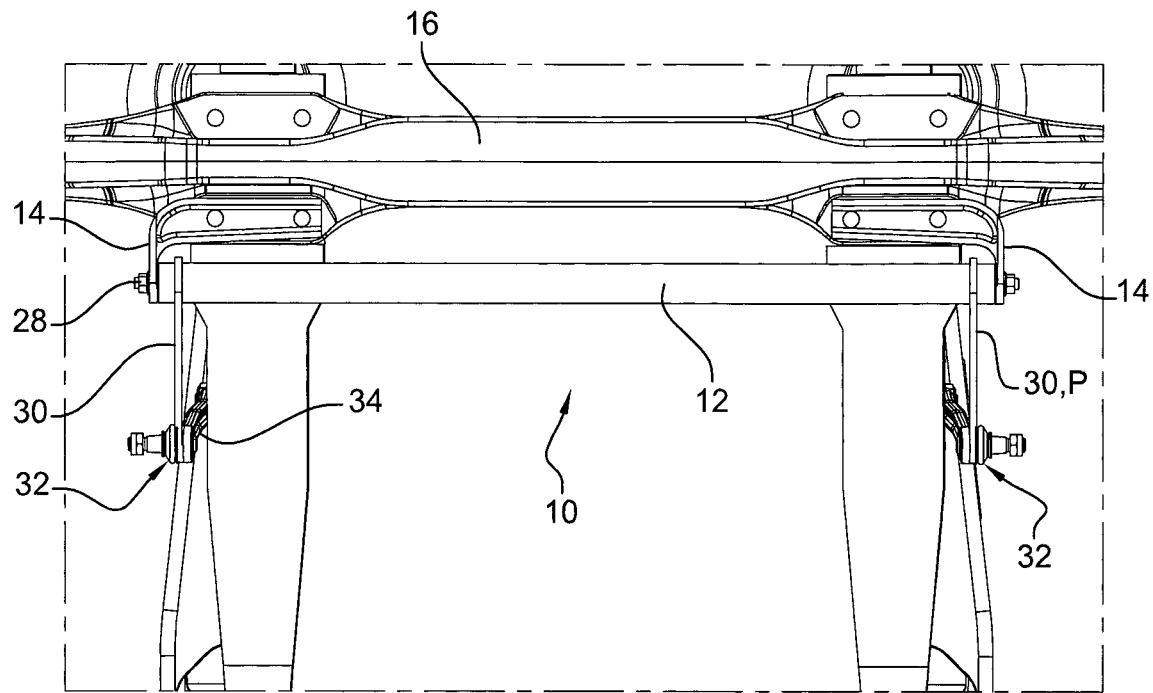
FIG. 3 is another view illustrating the stabilizer bar of FIG. 2, in use.
Figure 4:
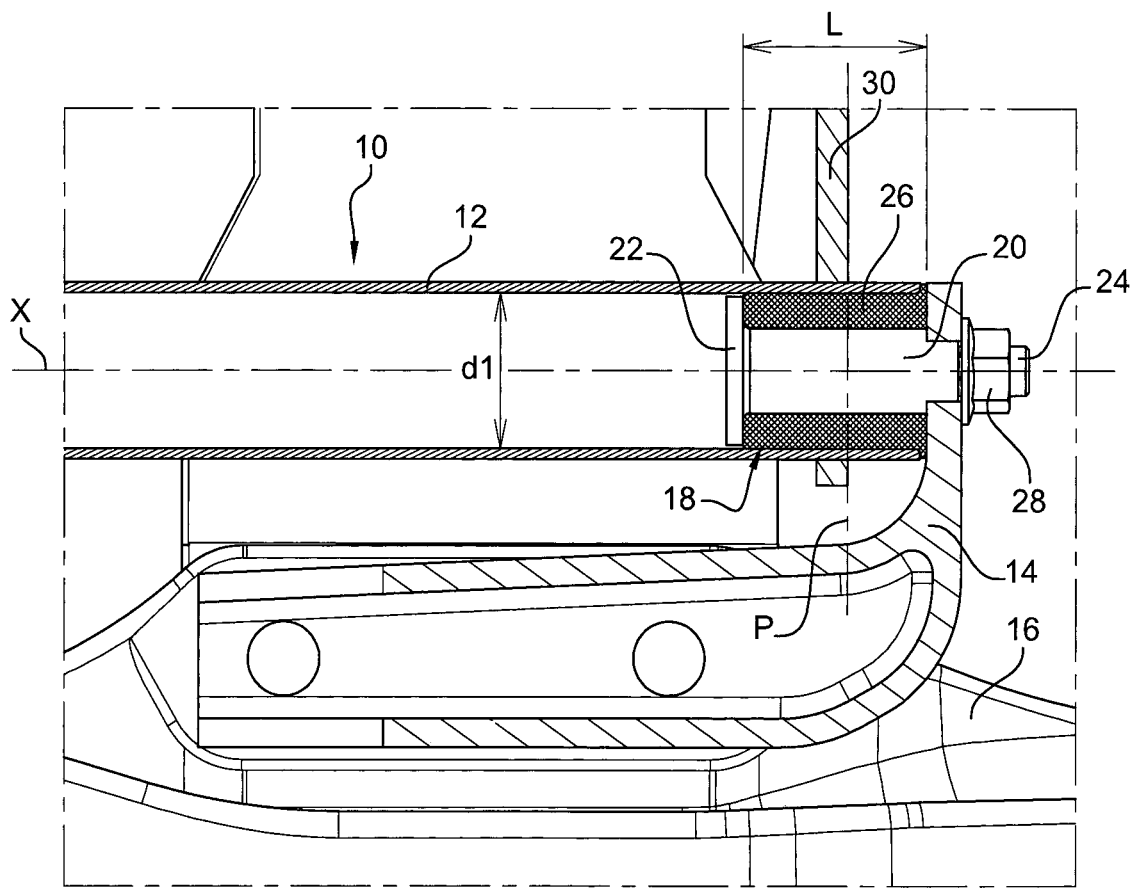
FIG. 4 is a sectional view to an enlarged scale illustrating part of the stabilizer bar of FIGS. 2 and 3.

Referring to FIGS. 2 to 4 of the accompanying drawings, a stabilizer bar 10 is illustrated which comprises an elongate shaft 12 mounted via brackets 14 to an axle 16 of a truck 17 (only a small part of which can be seen in the figures). In the illustrated arrangement, the shaft 12 is of hollow form along its entire length, and is preferably of a composite material form. It will be appreciated that as compared to arrangements including a solid steel shaft, or the like, considerable weight savings can be made. Whilst in the illustrated arrangement the shaft 12 is hollow throughout its length, it will be appreciated that this need not always be the case and arrangements are possible in which the shaft 12 is of solid form, or is hollow just adjacent the ends thereof, and such arrangements do not depart from the scope of the present invention.

As best seen in FIG. 4, within each end of the shaft 12 is located a bearing assembly 18, the bearing assembly 18 being secured to the associated bracket 14 in such a manner as to allow the shaft 12 to undergo limited angular movement relative to the bracket 14. The bearing assemblies 18 each take the form of a support rod 20 having an enlarged head 22 at an end thereof, and a screw threaded part 24 at an opposite end thereof. Encircling the rod 20 is a bushing 26 of a rubber or rubber-like material. The threaded part 24 projects from the shaft 12 and extends through an opening formed in the bracket 14, the rod 20 being secured to the bracket 14 by an associated nut 28. Preferably, the opening formed in the bracket 14 is of non-circular shape, and the part of the rod 20 that extends through the opening is similarly shaped so as to hold the rod 20 against rotation relative to the bracket. It will be appreciated that tightening of the nut 28 onto the threaded part 24 results in the bushing 26 being compressed between the head 22 and the bracket 14. The axial compression of the bushing 26 results in radial expansion thereof into engagement with the inner surface of the shaft 12. Accordingly, each end of the shaft 12 is securely attached to the associated bracket 14. Flexing of the material of the bushing 26 allows limited angular movement of the end parts of the shaft 12 to occur relative to the associated bracket 14. It will be appreciated that the manner in which the shaft 12 is mounted to the brackets 14 is such axial movement of the shaft 12 is restricted or substantially prevented, parts of the brackets 14 facing and abutting the ends of the shaft 12 to resist such axial movement.

Each end part of the shaft 12 has secured thereto a respective crank arm 30. Any suitable technique may be used to rigidly secure the crank arms 30 to the shaft 12, the technique used being dependent, in part, upon the materials chosen for the shaft 12 and the crank arms 30. By way of example, the crank arms 30 may be rigidly welded to the shaft 14. Alternative attachment techniques include clamping the crank arms 30 to the shaft 12. As illustrated, the crank arms 30 are attached to the parts of the shaft 12 containing the bearing assemblies 18. More specifically, the bushing 26 of each bearing assembly 18 extends inside the shaft 12 over a length L that is measured parallel to the axis X of the shaft 12 and each cranked arm 30 is attached to the outside surface of the shaft 12 at a point of attachment that is located within the length L.

The length of each bushing 26 is preferably comprised between a length equal to the inner diameter d1 of the shaft 12 and a length equal to twice said inner diameter d1.

Each crank arm 30 is of generally planar form and extends perpendicularly to the axis of the shaft 12. Adjacent the free end of each crank arm 30 is formed a connection point 32 in the form of an opening to which a stabilizer rod member 34 is pivotally secured, the stabilizer rod member 34 being pivotally attached, at its other end, to a part of the vehicle chassis or body, in use. It will be appreciated that, relative to the axis X of the shaft 12, the connection points 32 are aligned with the respective bearing assemblies 18.

In other words, each connection point 32 is substantially located in the same plane P as one of the bearing assemblies 18 supporting the shaft 12. Plane P is perpendicular to the axis X of the shaft. On FIGS. 3 and 4, the planar form of the crank arm 30 extends substantially in the plane P.

Accordingly, whilst the application of loads to the crank arms 30 via the stabilizer rod members 34 may cause relative angular movement between the ends of the shaft 12, the applied loadings do not cause bending of the shaft 12. The shaft 12 may thus be designed in such a manner as to be of relatively small dimensions and of low weight as no significant bending loads need to be withstood thereby.

In use, rolling movement is resisted by the stabilizer bar 10 in a manner substantially the same as with a conventional stabilizer bar, the rolling movement being transmitted via the stabilizer rod members 34 and crank arms 30 to the ends of the shaft 12, applying a torsional load to the shaft 12 which is resisted by the shaft 12 in such a manner as to control or limit further rolling movement. As set out hereinbefore, the controlling or resisting of rolling movement can be achieved using a stabilizer bar 10 that is of relatively low weight by virtue of the fact that it does not need to be able to withstand bending moments, the application of such loadings being avoided through the alignment of the connection points 32 with the bearing assemblies 18. The stabilizer bar 10 may be of reduced diameter through avoiding the need for it to be able to withstand such bending loads. Furthermore, by mounting the shaft 12 using bearing assemblies 18 that are located internally of the shaft 12, the overall dimensions of the stabilizer bar 10 can be reduced. Packaging of the stabilizer bar 10, in use, may thus be simplified, and ground clearance issues may be reduced. Furthermore, the bearing design avoids axial movement of the shaft 12.

Figure 1:
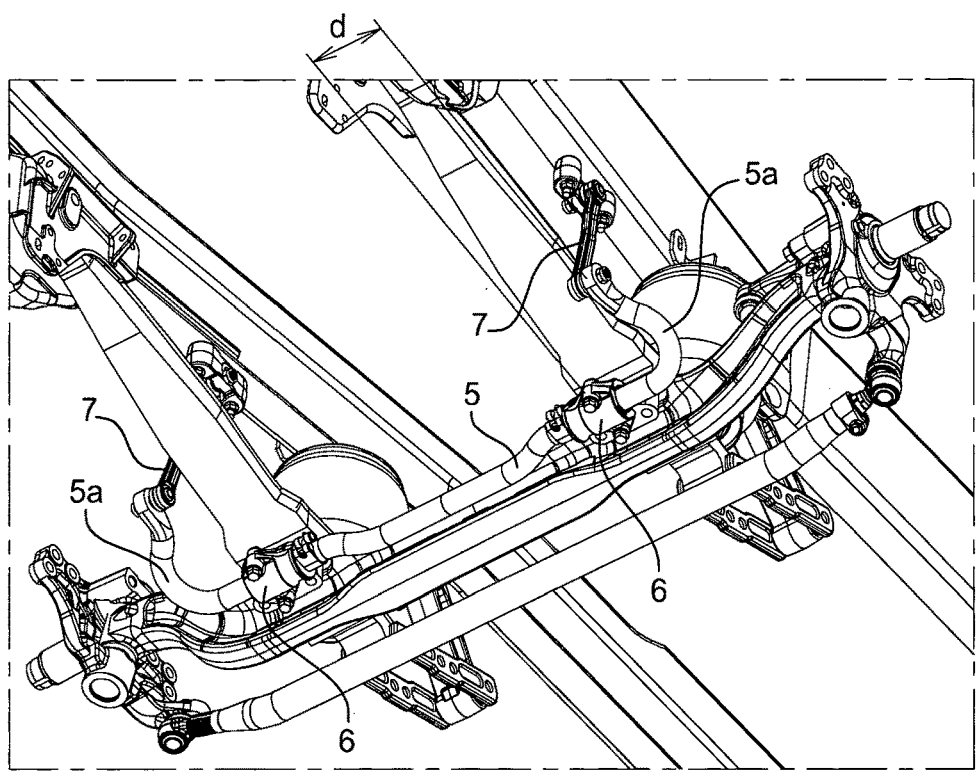
FIG. 1 is a perspective view illustrating part of a typical vehicle suspension arrangement.

Comparing the arrangement of FIGS. 2 to 4 with the typical arrangement shown in FIG. 1, it will be appreciated that a further benefit of the arrangement of the invention is that the stabilizer bar 10 is of relatively short axial length as the curves required to form the cranked end parts 5a of the FIG. 1 arrangement are not required. Accordingly, further packaging constraints are lifted through the use of the invention.

It will be, appreciated that the stabilizer bar 10 may be readily retrofitted to existing vehicles simply by replacing the previously fitting stabilizer bar with the stabilizer bar according to an embodiment of the invention. Existing vehicles may thus be modified in such a manner as to achieve many of the benefits of the invention.

Whilst described hereinbefore in relation to a truck, the invention may be applied to a range of other types of vehicle, and may be used in conjunction with front or rear axles or other types of suspension if desired.

It will be understood that the present invention is not limited to the specific embodiment described above and illustrated in the accompanying drawings; rather, the skilled person will recognize that many changes and modifications may be made within the scope of the invention as defined by the appended claims.

The invention claimed is:

1. A stabilizer bar comprising:
a shaft that is hollow at least adjacent ends thereof, and that is supported by bearings which are located within the shaft;
cranked parts being provided at or adjacent each end of the shaft, each cranked part having a connection point for connection, in use, to a respective stabilizer rod member, and each connection point is substantially aligned with a respective bearing relative to an axis of the shaft, each bearing comprises a flexible material bushing located upon a support and compressed between a part of the support and a part of a respective bracket.

2. The stabilizer bar according to claim 1, wherein the shaft is hollow throughout its length.

3. The stabilizer bar according to claim 1, wherein the bearings are located in the hollow ends of the shaft.

4. The stabilizer bar according to claim 1, wherein each bearing extends inside the shaft over a given length that is measured parallel to the axis of the shaft and wherein each cranked part is attached to the outside surface of the shaft at a point of attachment that is located within said given length.

5. The stabilizer bar according to claim 4, wherein said given length is comprised between a length equal to the inner diameter of the shaft and a length equal to twice said inner diameter.

6. The stabilizer bar according to claim 1, wherein the bearings are mounted upon brackets that abut ends of the shaft.

7. The stabilizer bar according to claim 1, wherein the shaft is of a composite material.

8. The stabilizer bar according to claim 1, wherein the cranked parts comprise crank arms secured to the shaft.

9. The stabilizer bar according to claim 8, wherein each crank arm is of substantially planar form.

10. The stabilizer bar according to claim 1, wherein each connection point comprises an opening formed in the respective cranked part.

11. The stabilizer bar according to claim 1, wherein the stabilizer bar is mounted to an axle of a vehicle by way of the bearings, and the connection points are connected, via the stabilizer rod members, to a chassis or body of the vehicle, wherein the vehicle comprises the chassis or body, the axle, and a suspension arrangement whereby the body is mounted upon the axle.

12. The stabilizer bar according to claim 1, wherein the stabilizer bar provides roll stabilization comprising providing a vehicle with a stabilizer bar in such a manner that rolling movements result in application of a torsional load to the shaft of the stabilizer bar, the substantially axial alignment of each connection point with the associated bearing relative to the axis of the shaft substantially avoiding the application of a bending moment to the shaft.

* * * * *